(12) United States Patent
Kent, Jr. et al.

(10) Patent No.: US 8,826,331 B2
(45) Date of Patent: Sep. 2, 2014

(54) SYSTEMS AND METHODS TO SCHEDULE RECORDING OF MEDIA CONTENT

(75) Inventors: Larry G. Kent, Jr., Loganville, GA (US); Brian K. Daigle, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1109 days.

(21) Appl. No.: 12/276,180

(22) Filed: Nov. 21, 2008

(65) Prior Publication Data

US 2010/0131988 A1 May 27, 2010

(51) Int. Cl.
| | |
|---|---|
| G06F 3/00 | (2006.01) |
| G06F 13/00 | (2006.01) |
| H04N 5/445 | (2011.01) |
| H04N 7/173 | (2011.01) |
| H04N 5/76 | (2006.01) |
| H04N 21/235 | (2011.01) |
| H04N 21/262 | (2011.01) |
| H04N 21/41 | (2011.01) |
| H04N 21/4147 | (2011.01) |
| H04N 21/433 | (2011.01) |
| H04N 21/435 | (2011.01) |
| H04N 21/8405 | (2011.01) |
| H04H 60/27 | (2008.01) |
| H04H 60/72 | (2008.01) |
| H04N 5/765 | (2006.01) |
| H04N 5/782 | (2006.01) |
| H04N 9/82 | (2006.01) |
| H04N 21/472 | (2011.01) |

(52) U.S. Cl.
CPC .................. *H04N 5/76* (2013.01); *H04H 60/27* (2013.01); *H04H 60/72* (2013.01); *H04N 5/765* (2013.01); *H04N 5/782* (2013.01); *H04N 9/8205* (2013.01); *H04N 21/235* (2013.01); *H04N 21/26283* (2013.01); *H04N 21/4135* (2013.01); *H04N 21/4147* (2013.01); *H04N 21/4334* (2013.01); *H04N 21/435* (2013.01); *H04N 21/47214* (2013.01); *H04N 21/8405* (2013.01)
USPC ............................................... 725/38; 725/93

(58) Field of Classification Search
None
See application file for complete search history.

(56) References Cited

U.S. PATENT DOCUMENTS

| | | | |
|---|---|---|---|
| 6,177,931 B1 * | 1/2001 | Alexander et al. ............... | 725/52 |
| 2002/0038457 A1 * | 3/2002 | Numata et al. .................. | 725/47 |
| 2002/0065678 A1 * | 5/2002 | Peliotis et al. ................... | 705/1 |
| 2002/0124252 A1 | 9/2002 | Schaefer | |
| 2003/0040962 A1 * | 2/2003 | Lewis ............................. | 705/14 |
| 2003/0079227 A1 * | 4/2003 | Knowles et al. ................ | 725/50 |
| 2003/0093790 A1 * | 5/2003 | Logan et al. .................... | 725/38 |

(Continued)

*Primary Examiner* — Mark D Featherstone
(74) *Attorney, Agent, or Firm* — Toler Law Group, PC

(57) ABSTRACT

Systems and methods to schedule recording of media content are provided. A particular method includes accessing at least one recording rule that specifies a first condition. The at least one recording rule indicates that a program of media content is to be scheduled for recording when the program satisfies the first condition. The method also includes accessing at least one recording exception that specifies a second condition. The at least one recording exception prohibits recording media content that satisfies the second condition. The method further includes determining a recording schedule by analyzing information regarding a plurality of programs of media content with respect to the at least one recording rule and the at least one recording exception.

22 Claims, 8 Drawing Sheets

(56) References Cited

U.S. PATENT DOCUMENTS

| | | | |
|---|---|---|---|
| 2003/0208762 A1* | 11/2003 | Hanai et al. | 725/58 |
| 2004/0006698 A1* | 1/2004 | Apfelbaum | 713/182 |
| 2007/0162936 A1 | 7/2007 | Stallings | |
| 2007/0212025 A1 | 9/2007 | Barton | |
| 2007/0214473 A1 | 9/2007 | Barton | |
| 2008/0101763 A1 | 5/2008 | Bhogal | |
| 2008/0120635 A1 | 5/2008 | Trimper | |
| 2008/0128495 A1 | 6/2008 | Weintraub | |

* cited by examiner

SYSTEMS AND METHODS TO SCHEDULE RECORDING OF MEDIA CONTENT

FIELD OF THE DISCLOSURE

The present disclosure is generally related to systems and methods to schedule recording of media content.

BACKGROUND

A media recording device, such as a digital video recorder (DVR) or a personal video recorder (PVR) may enable a user to record particular media content for later viewing. The media recording device may allow the user to specify that a particular program (e.g., a program that is scheduled to air at a particular time or on a particular date) is to be scheduled for recording. However, the user's flexibility in specifying programs to be recorded may be somewhat limited.

DETAILED DESCRIPTION

Systems and methods to schedule recording of media content are provided. A particular method includes accessing at least one recording rule that specifies a first condition. The at least one recording rule indicates that a program of media content is to be scheduled for recording when the program satisfies the first condition. The method also includes accessing at least one recording exception that specifies a second condition. The at least one recording exception prohibits recording media content that satisfies the second condition. The method further includes determining a recording schedule by analyzing information regarding a plurality of programs of media content with respect to the at least one recording rule and the at least one recording exception.

A particular system includes a memory to store first data specifying at least one recording rule and second data specifying at least one recording exception. The system also includes a scheduling module to generate a recording schedule based on the first data and the second data. The at least one recording rule specifies a first condition and indicates that a program of media content is to be scheduled for recording when the program satisfies the first condition. The at least one recording exception specifies a second condition and prohibits recording media content that satisfies the second condition.

In a particular embodiment, a computer-readable storage medium includes operational instructions that, when executed by a processor, cause the processor to access at least one recording rule that specifies a first condition. The at least one recording rule indicates that a particular program of media content is to be scheduled for recording when the particular program satisfies the first condition. The computer-readable storage medium also includes operational instructions that, when executed by the processor, cause the processor to access at least one recording exception that specifies a second condition. The at least one recording exception prohibits recording media content that satisfies the second condition. The computer-readable storage medium further includes operational instructions that, when executed by the processor, cause the processor to determine a recording schedule by analyzing information regarding a plurality of programs of media content with respect to the at least one recording rule and the at least one recording exception.

Figure 1:
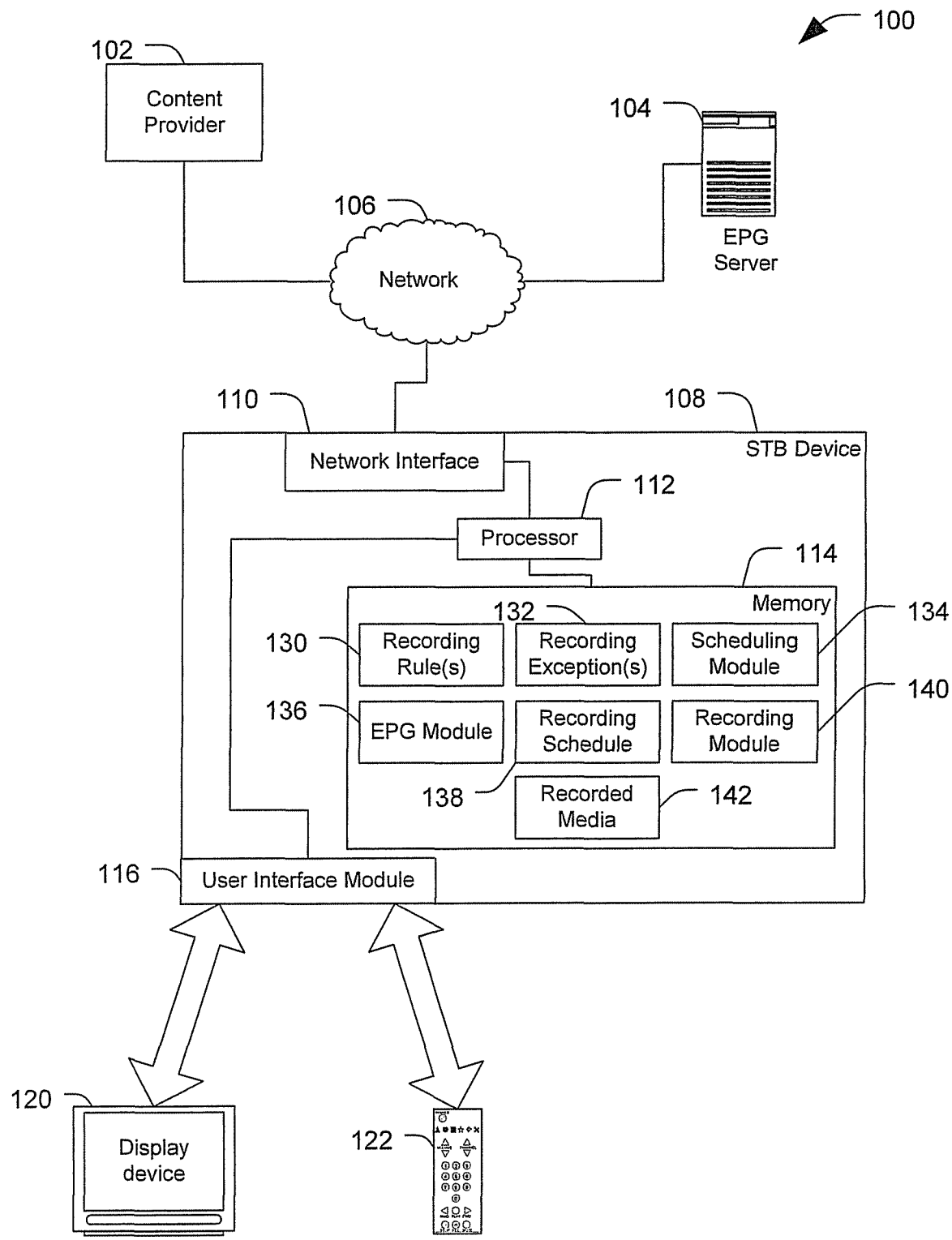
FIG. 1 is a block diagram of a first particular embodiment of a system to schedule recording of media content.

Referring to FIG. 1, a first particular embodiment of a system to schedule recording of media content is presented and designated 100. The system 100 includes a set-top box (STB) device 108 coupled to a network 106 to receive media content. For example, the STB device 108 may receive the media content from a content provider 102. The media content may include television content, radio content, video-on-demand (VOD) content, pay-per-view content, premium subscription content, other media content, or any combination thereof. The STB device 108 may also receive electronic program guide (EPG) data from an EPG server 104 via the network 106. For the sake of simplicity, only a single content provider 102, EPG server 104 and STB device 108 are illustrated; however, the system 100 may include any number of content providers 102, EPG servers 104, and STB devices 108.

The content provider 102 may include servers, routers, switches, other network devices, or any combination thereof, to provide the media content to the STB device 108. In a particular embodiment, the content provider 102 and the network 106 together are part of an Internet Protocol Television (IPTV) system. In another particular embodiment, the content provider 102 and the network 106 together are part of a cable television system. Additionally, the EPG server 104 may be operated by the content provider 102 or by a separate entity.

The STB device 108 may be coupled to the network 106 via a network interface 110. The network interface 110 may receive data from the network 106 and send data to the network 106. The STB device 108 may also include a processor 112, and a memory 114 coupled to the processor 112. The STB device 108 may be coupled via a user interface module 116 to an output device, such as a display device 120. Additionally, the STB device 108 may receive control input via the user input module 116. For example, the STB device 108 may receive control input from a remote control device 122.

In a particular embodiment, the memory 114 may store first data specifying at least one recording rule 130 and second data specifying at least one recording exception 132. In a particular embodiment, the user interface module 116 generates a user interface display that enables a user to specify the recording rule 130 and the recording exception 132. The recording rule 130 specifies a first condition and indicates that when a program satisfies the first condition, the program is to be scheduled for recording. The recording exception 132 specifies a second condition and prohibits recording media content that satisfies the second condition. For example, the first condition may be satisfied by a particular program when information descriptive of the particular program (e.g., in the EPG data) includes a specified keyword, when the particular program is associated with a specified genre, when the particular program has a specified title, when the particular program is associated with a particular media channel, when the particular program satisfies one or more other criterion, or any combination thereof. A particular program may satisfy the second condition, for example, when information descriptive of the particular program includes a specified keyword, the particular program is a flashback or revisit episode of a program, when the particular program deals with a specified topic, when the particular program has a release date that satisfies the second condition, when the particular program satisfies one or more other criteria, or any combination thereof.

The STB device 108 may also include an EPG module 136 to receive the EPG data from the EPG server 104. The EPG data is descriptive of a plurality of programs of media content. For example, the EPG data may include a transmission schedule that identifies times and dates when particular programs are to be transmitted from the content provider 102, and descriptive information regarding the particular programs.

The STB device 108 may also include a scheduling module 134. The scheduling module 134 may generate a recording schedule 138 based on the recording rules 130 and the recording exceptions 132. For example, the scheduling module 134 may analyze the EPG data with respect to the first condition and the second condition to identify programs that satisfy the first condition and that do not satisfy the second condition. To illustrate, the scheduling module 134 may search the EPG data to identify a first set of programs that satisfy the first condition. The first set of programs may be searched to identify a second set of programs that satisfy the second condition. Programs of the first set of programs that are not in the second set of programs may be scheduled for recording by the scheduling module 134. In another illustrative example, the scheduling module 134 may search the EPG data to identify a first set of programs that do not satisfy the second condition, search the first set of programs to identify a second set of programs that satisfy the first condition, and schedule programs of the second set of programs for recording. In a particular embodiment, search the EPG data may include performing a keyword search of metadata associated with programs identified in the EPG data to determine whether any of the identified programs satisfies the first or second condition.

The STB device 108 may also include a recording module 140. The recording module 140 may automatically record media content received from the content provider 102 based on the recording schedule 138. For example, the recording module 140 may store recorded media 142 in the memory 114. The user interface module 116 may generate a display that enables the user to modify the recording schedule 138.

Figure 2:
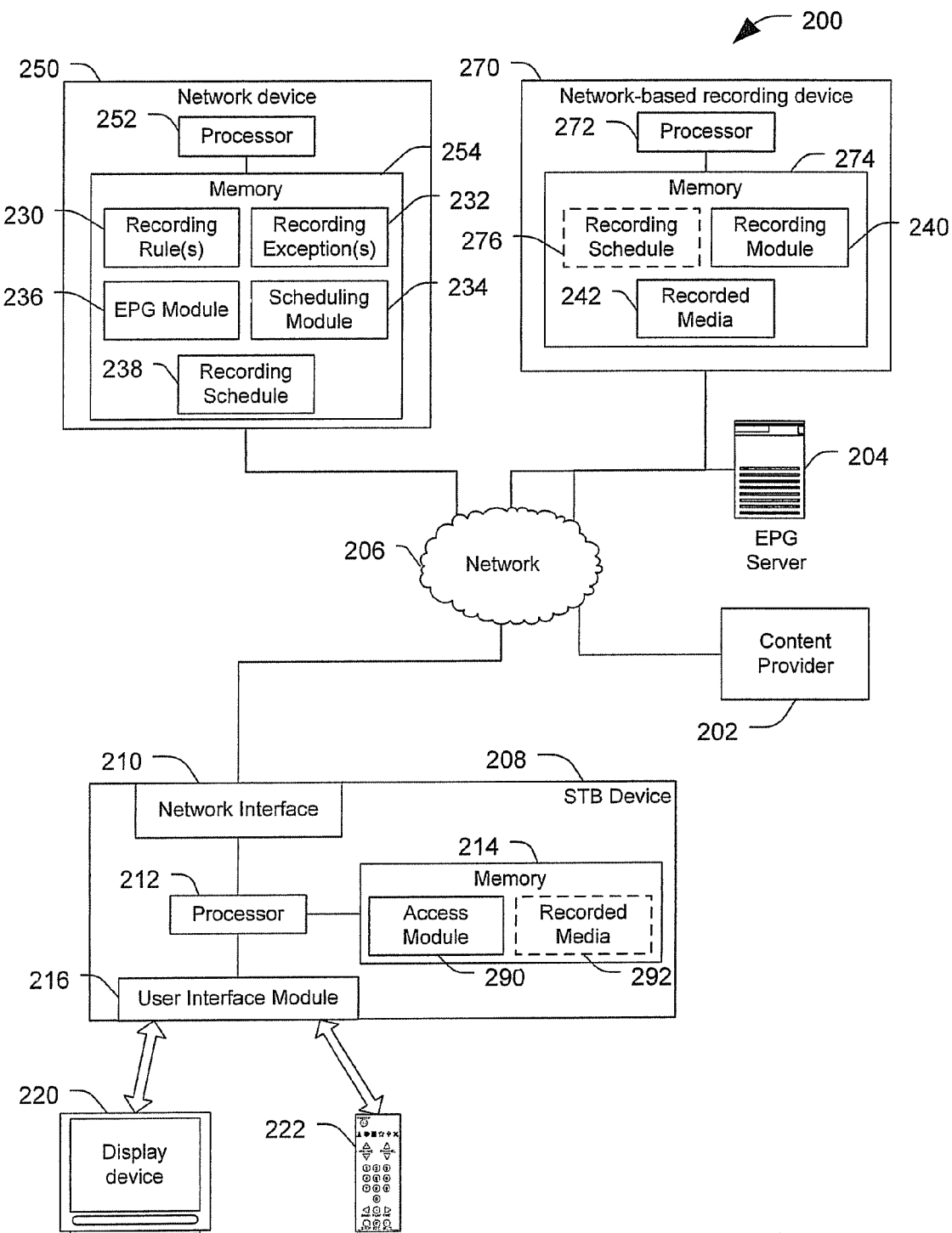
FIG. 2 is a block diagram of a second particular embodiment of a system to schedule recording of media content.

FIG. 2 illustrates a second particular embodiment of a system to schedule recording of media content, designated 200. The system 200 includes a set-top box (STB) device 208 coupled to a network 206 to receive media content. For example, the STB device 208 may receive the media content from a content provider 202. The media content may include television content, radio content, video-on-demand (VOD) content, pay-per-view content, premium subscription content, other media content, or any combination thereof. The STB device 208 may also receive electronic program guide (EPG) data from an EPG server 204 via the network 206. The system 200 also includes a network device 250 to determine a recording schedule 238 and a network-based recording device 270 to record media content received from the content provider 202. For the sake of simplicity, only a single content provider 202, a single EPG server 204, a single STB device 208, a single network device 250, and a single network-based recording device 270 are illustrated; however, the system 200 may include any number of content providers 202, EPG servers 204, STB devices 208, network devices 250 and network-based recording devices 270.

The content provider 202 may include servers, routers, switches, other network devices, or any combination thereof, to provide the media content to the STB device 208 and to the network-based recording device 270. In a particular embodiment, the content provider 202 and the network 206 together are part of an Internet Protocol Television (IPTV) system. In another particular embodiment, the content provider 202 and the network 206 together are part of a cable television system. Additionally, the EPG server 204, the network device 250, the network-based recording device 270, or any combination thereof, may be operated by the content provider 202 or by one or more other entities.

The network device 250 may include a processor 252 and a memory 254 accessible to the processor 252. The memory 254 may store first data specifying at least one recording rule 230 and second data specifying at least one recording exception 232. The recording rule 230 specifies a first condition and indicates that when a program satisfies the first condition, the program is to be scheduled for recording. The recording exception 232 specifies a second condition and prohibits recording media content that satisfies the second condition. For example, the first condition may be satisfied by a particular program when information descriptive of the particular program (e.g., in the EPG data) includes a specified keyword, when the particular program is associated with a specified genre, when the particular program has a specified title, when the particular program is associated with a particular media channel, when the particular program satisfies one or more other criteria, or any combination thereof. A particular program may satisfy the second condition, for example, when information descriptive of the particular program includes a specified keyword, the particular program is a flashback or revisit episode of a program, when the particular program deals with a specified topic, when the particular program has a release date that satisfies the second condition, when the particular program satisfies one or more other criteria, or any combination thereof.

The network device 250 may also include an EPG module 236 to receive the EPG data from the EPG server 204. The EPG data is descriptive of a plurality of programs of media content. For example, the EPG data may include a transmission schedule that identifies times and dates when particular programs are to be transmitted from the content provider 202, and descriptive information regarding the particular programs.

The network device 250 may also include a scheduling module 234. The scheduling module 234 may generate a recording schedule 238 based on the recording rule 230 and the recording exception 232. For example, the scheduling module 234 may analyze the EPG data with respect to the first condition and the second condition to identify programs that satisfy the first condition and that do not satisfy the second condition. To illustrate, the scheduling module 234 may search the EPG data to identify a first set of programs that satisfy the first condition. The first set of programs may be searched to identify a second set of programs that satisfy the second condition. Programs of the first set of programs that are not in the second set of programs may be scheduled for recording by the scheduling module 234. In another illustrative example, the scheduling module 234 may search the EPG data to identify a first set of programs that do not satisfy the second condition, search the first set of programs to identify a second set of programs that satisfy the first condition, and schedule programs of the second set of programs for recording. In a particular embodiment, searching the EPG data may include performing a keyword search of metadata associated with programs identified in the EPG data to determine whether any of the identified programs satisfy the first or second condition.

The network device 250 may send the recording schedule 238 determined by the scheduling module 234 to the network-based recording device 270. The network-based recording device 270 may include a processor 272 and memory 274 accessible to the processor 272. The memory 274 may store received recording schedule information at recording schedule 276. The network-based recording device 270 may also include a recording module 240. The recording module 240 may automatically record media content received from the content provider 202 based on the recording schedule 276. In a particular embodiment, the recording schedule 276 at the network-based recording device 270 may include the recording schedule 238 determined by the network device 250 as well as other information provided by a user of the STB device 208. For example, the user interface module 216 of the STB device 208 may generate a user interface display that enables the user to modify the recording schedule 276 at the network-based recording device 270.

The STB device 208 may be coupled to the network 206 via a network interface 210. The network interface 210 may receive data from the network 206 and send data to the network 206. The STB device 208 may also include a processor 212, and a memory 214 coupled to the processor 212. The STB device 208 may be coupled via the user interface module 216 to an output device, such as a display device 220. Additionally, the STB device 208 may receive control input via the user input module 216. For example, the STB device 208 may receive control input from a remote control device 222. In a particular embodiment, the STB device 208 includes an access module 290. The access module 290 is executable to access recorded media 242 at the network-based recording device 270. For example, the STB device 208 may download the recorded media 242 from the network-based recording device 270 and store the recorded media at the memory 214 as recorded media 292. In another example, the STB device 208 may receive a media stream including the recorded media 242 from the network-based recording device 270. The STB device 208 may process the received media content for presentation via the output device (e.g., the display device 220). In a particular embodiment, the STB device 208 also accesses additional media content, such as via the content provider 202, and stores the additional media content at the memory 214 as recorded media 292.

Figure 3:
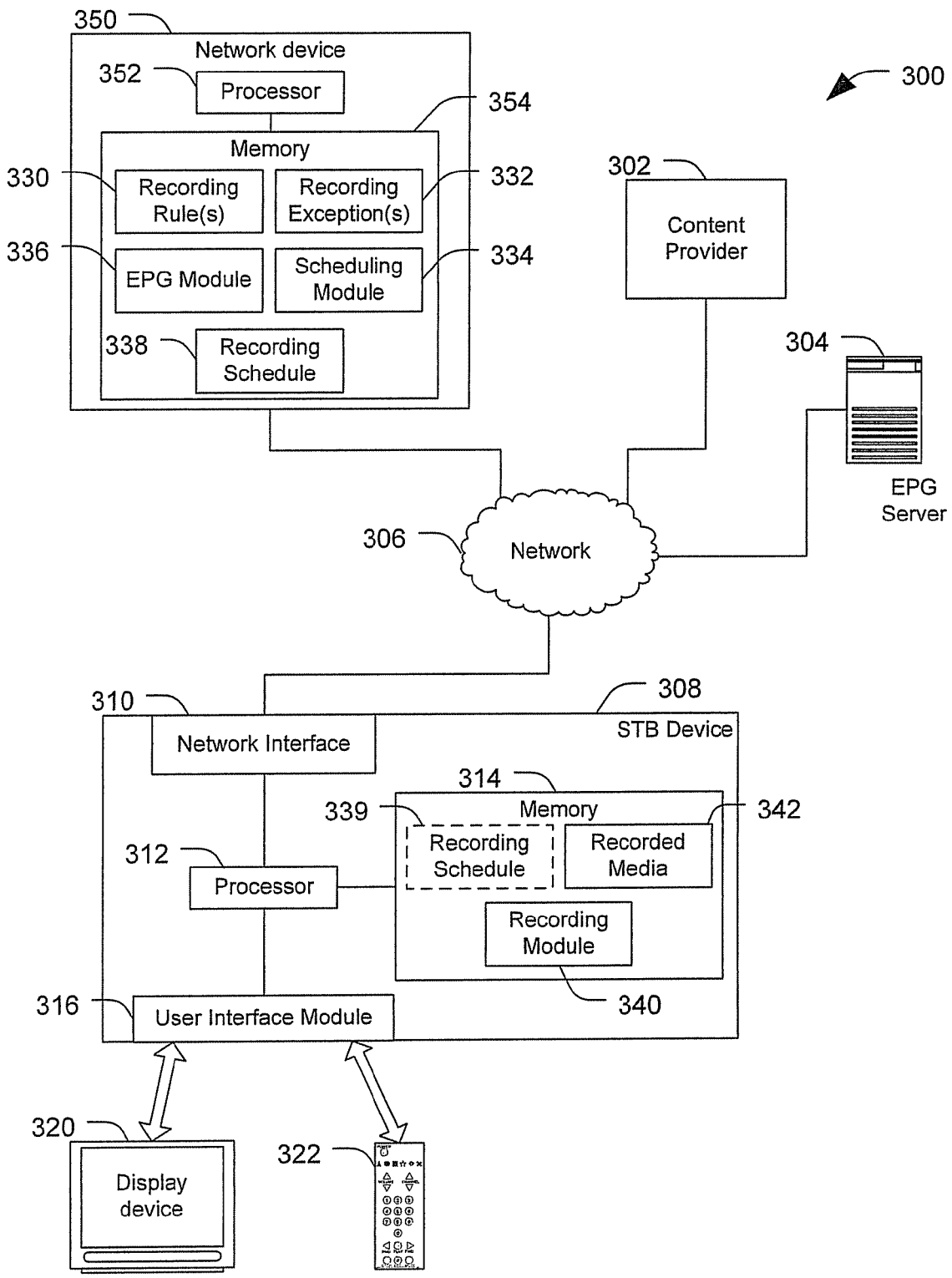
FIG. 3 is a block diagram of a third particular embodiment of a system to schedule recording of media content.

FIG. 3 illustrates a third particular embodiment of a system to schedule recording of media content, designated 300. The system 300 includes a set-top box (STB) device 308 coupled to a network 306 to receive media content. For example, the STB device 308 may receive the media content from a content provider 302. The media content may include television content, radio content, video-on-demand (VOD) content, pay-per-view content, premium subscription content, other media content, or any combination thereof. The STB device 308 may also receive electronic program guide (EPG) data from an EPG server 304 via the network 306. The system 300 also includes a network device 350 to determine a recording schedule 338. For the sake of simplicity, only a single content provider 302, a single EPG server 304, a single STB device 308, and a single network device 350 are illustrated; however, the system 300 may include any number of content providers 302, EPG servers 304, STB devices 308, and network devices 350.

The content provider 302 may include servers, routers, switches, other network devices, or any combination thereof, to provide the media content to the STB device 308. In a particular embodiment, the content provider 302 and the network 306 together are part of an Internet Protocol Television (IPTV) system. In another particular embodiment, the content provider 302 and the network 306 together are part of a cable television system. Additionally, the EPG server 304, the network device 350, or both, may be operated by the content provider 302 or by one or more other entities.

The network device 350 may include a processor 352 and a memory 354 accessible to the processor 352. The memory 354 may store first data specifying at least one recording rule 330 and second data specifying at least one recording exception 332. The recording rule 330 specifies a first condition and indicates that when a program satisfies the first condition, the program is to be scheduled for recording. The recording exception 332 specifies a second condition and prohibits recording media content that satisfies the second condition. For example, the first condition may be satisfied by a particular program when information descriptive of the particular program (e.g., in the EPG data) includes a specified keyword, when the particular program is associated with a specified genre, when the particular program has a specified title, when the particular program is associated with a particular media channel, when the particular program satisfies one or more other criteria, or any combination thereof. A particular program may satisfy the second condition, for example, when information descriptive of the particular program includes a specified keyword, the particular program is a flashback or revisit episode of a program, when the particular program deals with a specified topic, when the particular program has a release date that satisfies the second condition, when the particular program satisfies one or more other criteria, or any combination thereof.

The network device 350 may also include an EPG module 336 to receive the EPG data from the EPG server 304. The EPG data is descriptive of a plurality of programs of media content. For example, the EPG data may include a transmission schedule that identifies times and dates when particular programs are to be transmitted from the content provider 302, and descriptive information regarding the particular programs.

The network device 350 may also include a scheduling module 334. The scheduling module 334 may generate a recording schedule 338 based on the recording rule 330 and the recording exception 332. For example, the scheduling module 334 may analyze the EPG data with respect to the first condition and the second condition to identify programs that satisfy the first condition and that do not satisfy the second condition. To illustrate, the scheduling module 334 may search the EPG data to identify a first set of programs that satisfy the first condition. The first set of programs may be searched to identify a second set of programs that satisfy the second condition. Programs of the first set of programs that are not in the second set of programs may be scheduled for recording by the scheduling module 334. In another illustrative example, the scheduling module 334 may search the EPG data to identify a first set of programs that do not satisfy the second condition, search the first set of programs to identify a second set of programs that satisfy the first condition, and schedule programs of the second set of programs for recording. In a particular embodiment, searching the EPG data may include performing a keyword search of metadata associated with programs identified in the EPG data to determine whether any of the identified programs satisfy the first or second condition.

The network device 350 may send the recording schedule 338 determined by the scheduling module 334 to the STB device 308. The STB device 308 may include a processor 312 and a memory 314 accessible to the processor 312. The memory 314 may store received recording schedule information at recording schedule 339. The STB device 308 may also include a recording module 340. The recording module 340 may automatically record media content at recorded media 342 based on the recording schedule 339. In a particular embodiment, the recording schedule 339 at the STB device 308 may include the recording schedule 338 determined by the network device 350 as well as other information provided by a user of the STB device 308. For example, a user interface module 316 of the STB device 308 may generate a user interface display that enables the user to modify the recording schedule 339 at the STB device 308 to schedule recording of additional media content or to cancel recording of media content scheduled to be recorded.

The STB device 308 may be coupled to the network 306 via a network interface 310. The network interface 310 may receive data from the network 306 and send data to the network 306. For example, the recording rule 330 and the recording exception 332 may be input by a user at the STB device 308 and sent to the network device 350 via the network 306. The STB device 308 may also include a processor 312, and a memory 314 coupled to the processor 312. The STB device 308 may be coupled via the user interface module 316 to an output device, such as a display device 320. Additionally, the STB device 308 may receive control input via the user input module 316. For example, the STB device 308 may receive control input from a remote control device 322.

Figure 4:
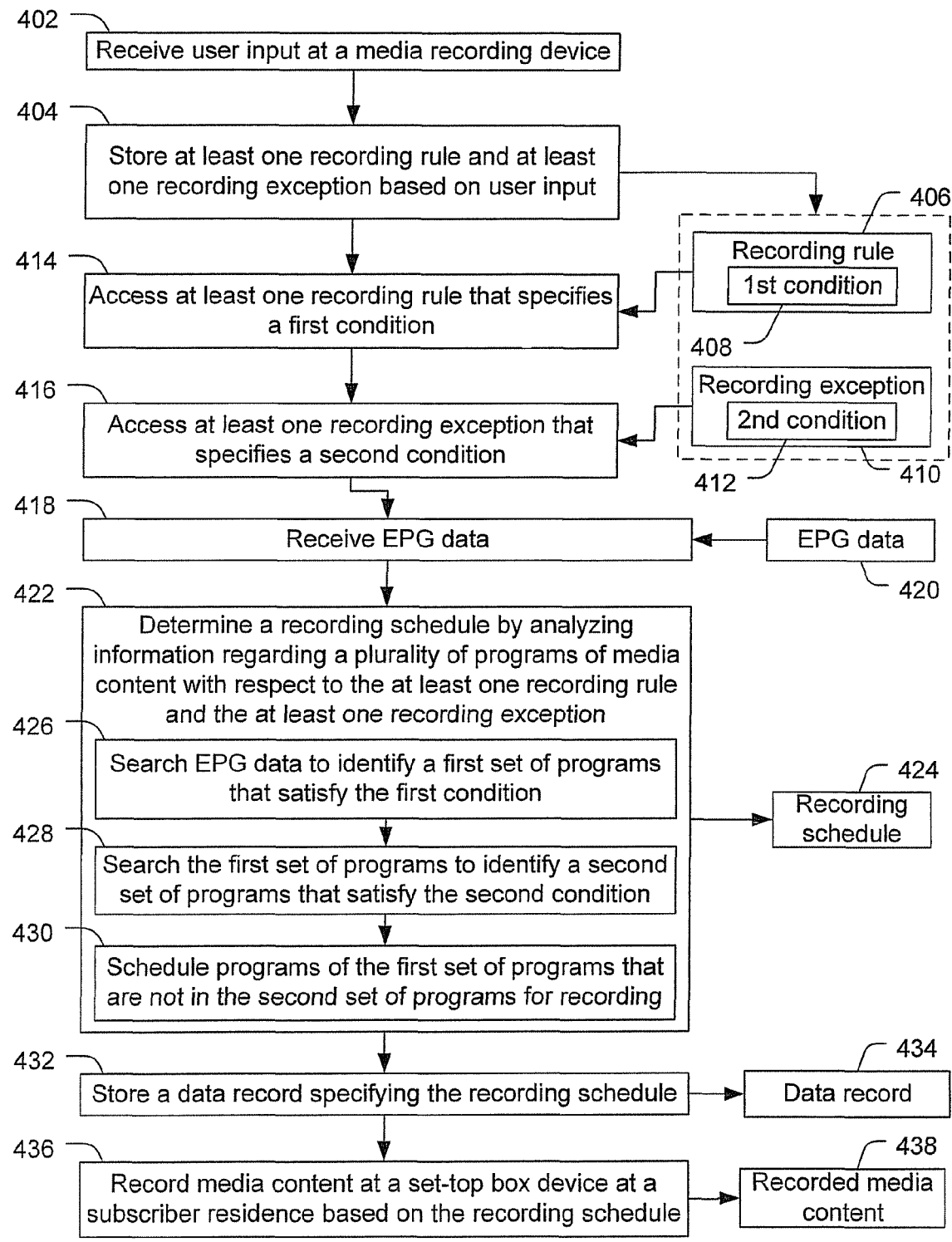
FIG. 4 is a flow chart of a first particular embodiment of a method to schedule recording of media content.

Referring to FIG. 4, a first particular embodiment of a method to schedule recording of media content is illustrated. The method includes, at 402, receiving user input at a media recording device. The user input specifies at least one recording rule 406 and at least one recording exception 410. The at least one recording rule 406 and the at least one recording exception 410 may be stored at a memory, at 404. For example, the recording rule 406 and the recording exception 410 may stored at a memory of a set-top box device or a network device as discussed with reference to FIGS. 1-3.

The recording rule 406 includes a first condition 408 which is used to identify programs of media content to be scheduled for recording. For example, the first condition 408 may be satisfied by a particular program when information descriptive of the particular program includes a specified keyword, when the particular program is associated with a specified genre, when the particular program has a specified title, when the particular program is associated with a particular media channel, when the particular program satisfies one or more other criteria, or any combination thereof. The recording exception 410 includes a second condition 412 that is used to identify programs that are not to be scheduled for recording. For example, a particular program may satisfy the second condition 412 when information descriptive of the particular program includes a specified keyword, the particular program is a flashback or revisit episode of a program, when the particular program deals with a specified topic, when the particular program has a release date that satisfies the second condition 412, when the particular program satisfies one or more other criteria, or any combination thereof.

The method also includes, at 414, accessing the recording rule 406, and, at 416, accessing the recording exception 410. The method further includes, at 418, receiving electronic program guide (EPG) data 420. The EPG data 420 includes scheduling information and metadata associated with a plurality of programs of media content. At 422, a recording schedule 424 is determined by analyzing information regarding a plurality of programs of media content with respect to the recording rule 406 and the recording exception 410. In a particular embodiment, determining the recording schedule 424 includes, at 426, searching the EPG data 420 to identify a first set of programs that satisfy the first condition 408. The first set of programs may be searched, at 428, to identify a second set of programs that satisfy the second condition. Programs of the first set of programs that are not in the second set of programs are scheduled for recording, at 430. The recording schedule 424 may also be determined in other ways, as discussed with reference to FIGS. 5 and 6.

The method also includes, at 432, storing a data record 434 specifying the recording schedule 424. The data record 434 is accessible by the media recording device to cause the media recording device to automatically record programs of media content identified in the recording schedule 424. For example, as illustrated in FIG. 1, the recording schedule 424 may be stored at a set-top box (STB) device 108. The STB device 108 may access the recording schedule 424 from memory to automatically record media content. In another example, as illustrated in FIG. 2, the recording schedule 424 may be determined by a network device 250 and sent to a network-based recording device 270. The network-based recording device 270 may access the recording schedule 424 from a memory to automatically record media content. In yet another example, as illustrated in FIG. 3, the recording schedule 424 may be determined by a network device 350 and sent to a STB device 308. The STB device 308 may access the recording schedule 424 from a memory to automatically record media content.

In a particular embodiment, the method also includes, at 436, recording media content 438 at a set-top box device at a subscriber residence based on the recording schedule 424 or the data record 434.

Figure 5:
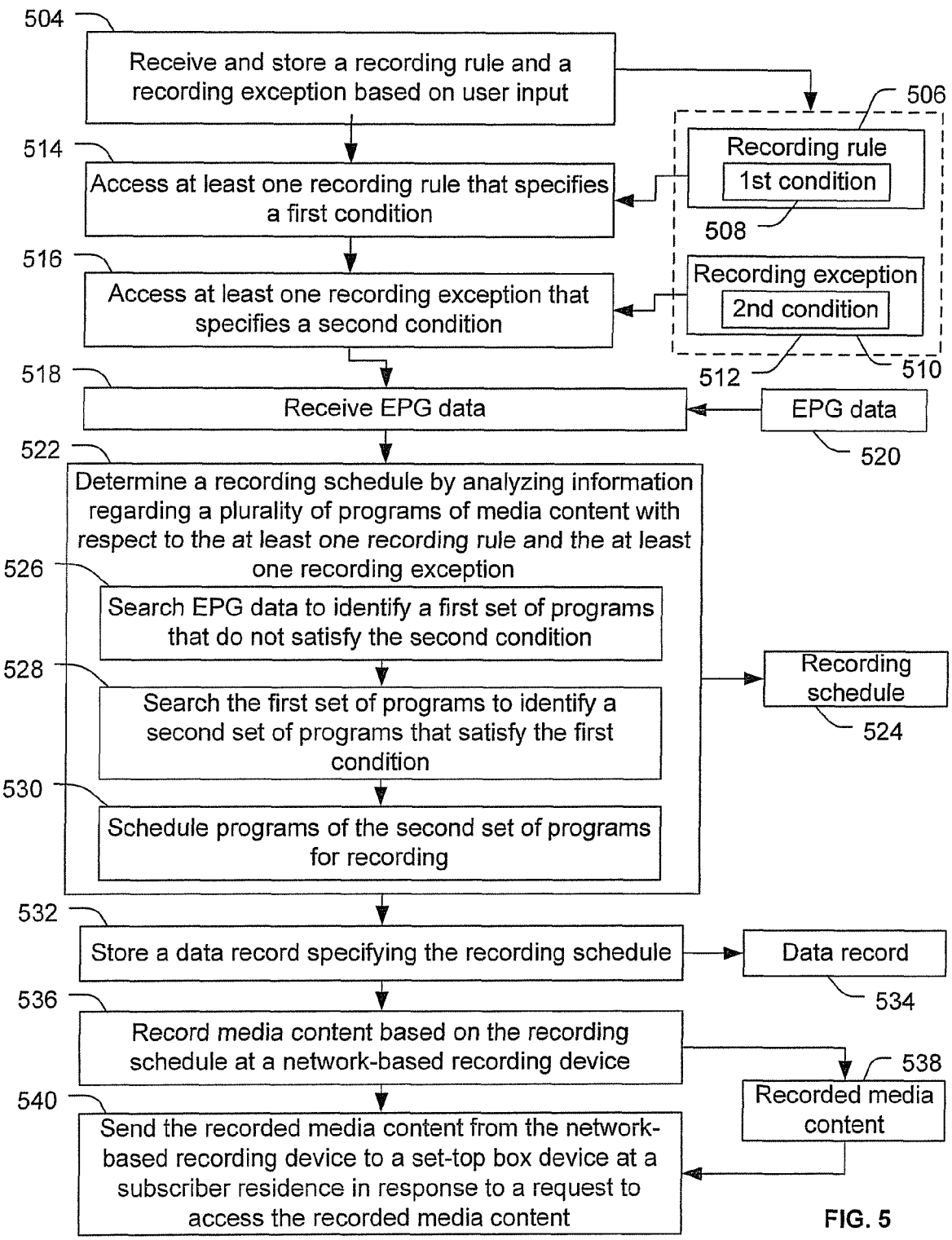
FIG. 5 is a flow chart of a second particular embodiment of a method to schedule recording of media content.

Referring to FIG. 5, a second particular embodiment of a method to schedule recording of media content is illustrated. The method includes, at 504, receiving and storing a recording rule 506 and a recording exception 510 based on user input. The recording rule 506 and the recording exception 510 may be stored at a memory. For example, the recording rule 506 and the recording exception 510 may stored at a memory of a set-top box device or a network device as discussed with reference to FIGS. 1-3.

The recording rule 506 includes a first condition 508 that is used to identify programs of media content to be scheduled for recording. For example, the first condition 508 may be satisfied by a particular program when information descriptive of the particular program includes a specified keyword, when the particular program is associated with a specified genre, when the particular program has a specified title, when the particular program is associated with a particular media channel, when the particular program satisfies one or more other criteria, or any combination thereof. The recording exception 510 includes a second condition 512 that is used to identify programs are not to be scheduled for recording. For example, a particular program may satisfy the second condition 512 when information descriptive of the particular program includes a specified keyword, the particular program is a flashback or revisit episode of a program, when the particular program deals with a specified topic, when the particular program has a release date that satisfies the second condition 512, when the particular program satisfies one or more other criteria, or any combination thereof.

The method also includes, at 514, accessing the recording rule 506, and, at 516, accessing the recording exception 510. The method further includes, at 518, receiving electronic program guide (EPG) data 520. The EPG data 520 includes scheduling information and metadata associated with a plurality of programs of media content. At 522, a recording schedule 524 is determined by analyzing information regarding a plurality of programs of media content with respect to the recording rule 506 and the recording exception 510. In a particular embodiment, determining the recording schedule 524 includes, at 526, searching the EPG data 520 to identify a first set of programs that do not satisfy the second condition 512. The first set of programs is searched, at 528, to identify a second set of programs that satisfy the first condition. Programs of the second set of programs are scheduled for recording, at 530. The recording schedule 524 may also be determined in other ways, as discussed with reference to FIGS. 4 and 6.

The method also includes, at 532, storing a data record 534 specifying the recording schedule 524. The data record 534 is accessible by the media recording device to cause the media recording device to automatically record programs of media content identified in the recording schedule 524. For example, as illustrated in FIG. 1, the recording schedule 524 may be stored at a set-top box (STB) device 108. The STB device 108 may access the recording schedule 524 from memory to automatically record media content. In another example, as illustrated in FIG. 2, the recording schedule 524 may be determined by a network device 250 and sent to a network-based recording device 270. The network-based recording device 270 may access the recording schedule 524 from a memory to automatically record media content. In yet another example, as illustrated in FIG. 3, the recording schedule 524 may be determined by a network device 350 and sent to a STB device 308. The STB device 308 may access the recording schedule 524 from a memory to automatically record media content.

In a particular embodiment, the method also includes, at 536, recording media content 538 at a network-based recording device based on the recording schedule 524 or the data record 534. At 540, the recorded media content 538 may be sent from the network-based recording device to a STB device at a subscriber residence in response to a request to access the recorded media content 538.

Figure 6:
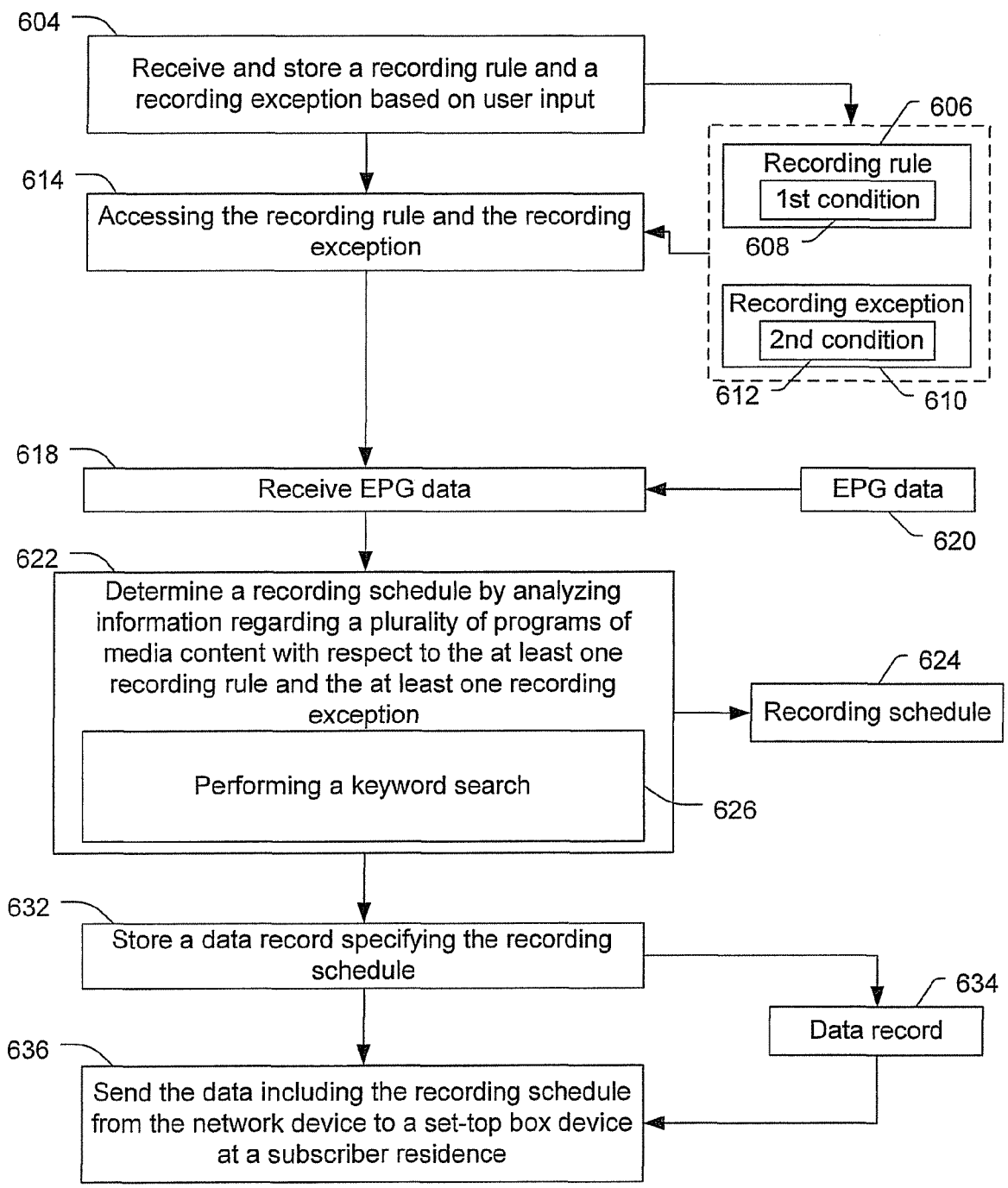
FIG. 6 is a flow chart of a third particular embodiment of a method to schedule recording of media content.

Referring to FIG. 6, a third particular embodiment of a method to schedule recording of media content is illustrated. The method includes, at 604, receiving and storing a recording rule 606 and a recording exception 610 based on user input. The recording rule 606 and the recording exception 610 may be stored at a memory. For example, the recording rule 606 and the recording exception 610 may stored at a memory of a set-top box device or a network device as discussed with reference to FIGS. 1-3.

The recording rule 606 includes a first condition 608 that is used to identify programs of media content to be scheduled for recording. For example, the first condition 608 may be satisfied by a particular program when information descriptive of the particular program includes a specified keyword, when the particular program is associated with a specified genre, when the particular program has a specified title, when the particular program is associated with a particular media channel, when the particular program satisfies one or more other criteria, or any combination thereof. The recording exception 610 includes a second condition 612 that is used to identify programs are not to be scheduled for recording. For example, a particular program may satisfy the second condition 612 when information descriptive of the particular program includes a specified keyword, the particular program is a flashback or revisit episode of a program, when the particular program deals with a specified topic, when the particular program has a release date that satisfies the second condition 612, when the particular program satisfies one or more other criteria, or any combination thereof.

The method also includes, at 614, accessing the recording rule 606 and the recording exception 610. The method further includes, at 618, receiving electronic program guide (EPG) data 620. The EPG data 620 includes scheduling information and metadata associated with a plurality of programs of media content. At 622, a recording schedule 624 is determined by analyzing information regarding a plurality of programs of media content with respect to the recording rule 606 and the recording exception 610. In a particular embodiment, determining the recording schedule 624 includes, at 626, performing a keyword search of the metadata of the EPG data 620. For example, the metadata may be searched with respect to one or more keywords specified in the first condition 608, the second condition 612, or both. To illustrate, when metadata associated with a particular program includes a keyword specified in the first condition 608, the particular program may be scheduled for recording unless the metadata also includes a keyword specified in the second condition 612. The recording schedule 624 may also be determined in other ways, as discussed with reference to FIGS. 4 and 5.

The method also includes, at 632, storing a data record 634 specifying the recording schedule 624. The data record 634 is accessible by a media recording device to cause the media recording device to automatically record programs of media content identified in the recording schedule 624. In a particular embodiment, the method also includes, at 636, sending the data record 634 including the recording schedule 624 to a set-top box (STB) device at a subscriber residence. The STB device may automatically record media based on the data record 634.

Figure 7:
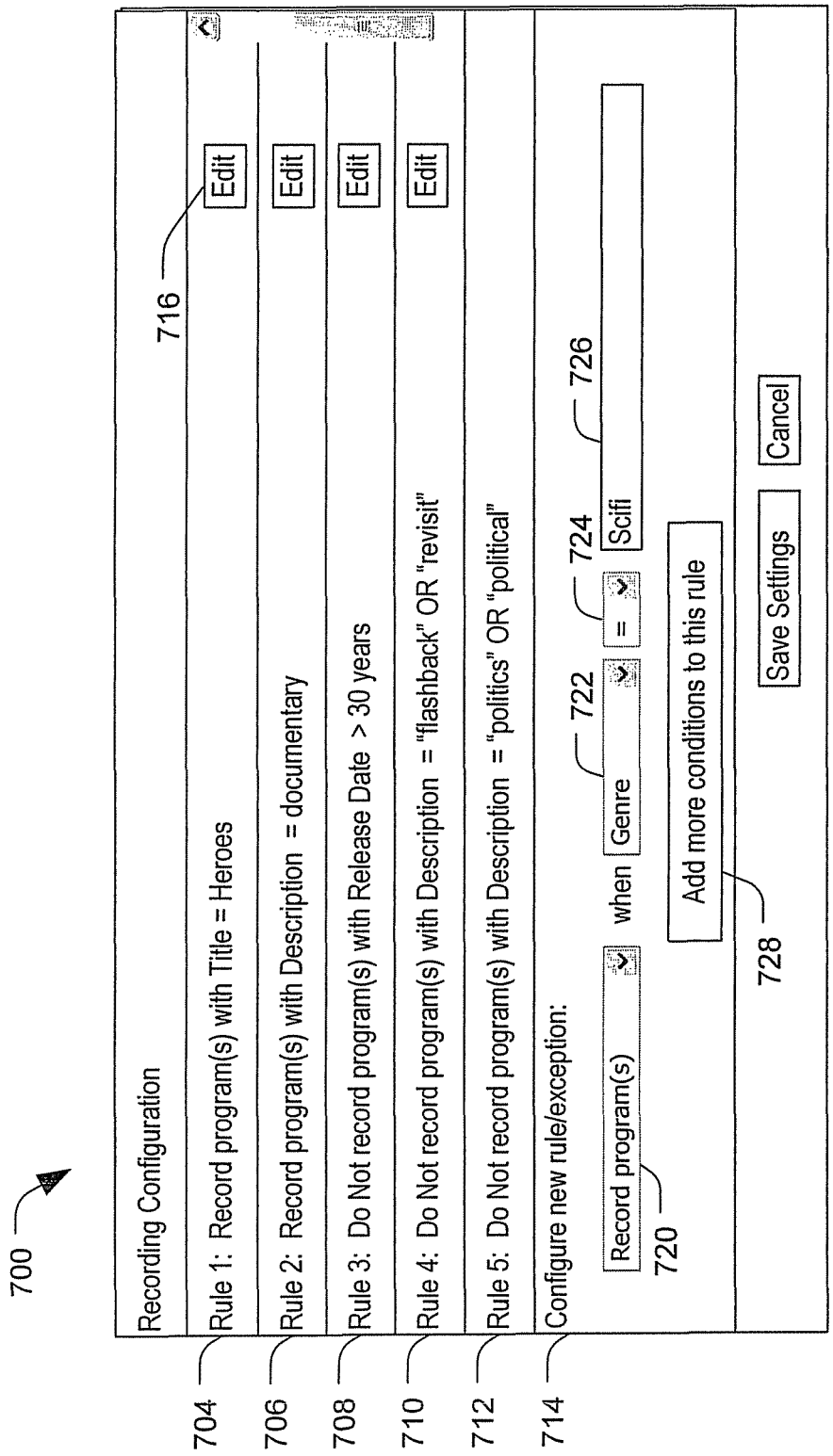
FIG. 7 is an illustration of a particular embodiment of a user interface display to schedule recording of media content.

FIG. 7 illustrates a particular embodiment of a user interface display to schedule recording of media content, designated 700. The user interface display 700 relates to recording configuration settings. The user interface display 700 may be presented by a set-top box device via a display device. For example, the user interface display 700 may be displayed via one of the display devices 120, 220 or 320 by one of the STB devices 108, 208, or 308 discussed with reference to FIG. 1-3. The user interface display 700 may provide a user with information regarding current recording configuration settings and enable the user to modify the recording configuration settings.

The recording configurations settings illustrated in the user interface display 700 include one or more recording rules and one or more recording exceptions. Recording rules may indicate that certain media content should be recorded and recording exceptions may indicate that certain media content should not be recorded. For example, a first entry 704 of the recording configuration settings indicates that media content associated with a program entitled "Heroes" should be recorded. A second entry 706 of the recording configuration settings indicates that media content associated with a program description indicating that the program is a documentary should be recorded. A third entry 708 of the recording configuration settings indicates that media content associated with a release date more than 30 years ago should not be recorded. A fourth entry 710 of the recording configuration settings indicates that media content associated with a description that includes the keywords "flashback" or "revisit" should not be recorded. A fifth entry 712 of the recording configuration settings indicates that media content associated with a description that includes the keywords "politics" or "political" should not be recorded. Thus, the recording rules and recording exceptions may specify conditions related to specific descriptive information associated with a program, such as a title, a release date, or a topic of the program. Additionally, the recording rules and recording exceptions may be related to all descriptive information associated with a program. For example, all of the descriptive information associated with a program may be searched to determine whether a specified keyword is present.

In operation, the recording configuration settings may be used to analyze electronic program guide (EPG) data to determine whether one or more programs identified in the EPG data should be scheduled for recording. For example, the EPG data may be searched to identify programs that meet a condition of a recording rule. If the identified program does not also satisfy a condition of at least one recording exception, the program may be scheduled for recording. In another example, the EPG data may be searched to identify programs that meet one or more conditions of the recording exceptions. The identified programs may be eliminated from consideration and the remaining programs of the EPG data may be searched to identify a program that satisfies a condition of at least one recording rule. The identified program may be scheduled for recording. To illustrate, assume that a particular set of EPG data includes a documentary about the year 2000 political campaign for the presidency. The second entry 706 of the recording configuration settings indicates that programs associated with the description "documentary" are to be recorded. However, the fifth entry 712 of the recording configuration settings indicates that if the descriptive information associated with a program includes the terms "politics" or "political", the program should not be recorded. Thus, the documentary about the year 2000 political campaign for the presidency would not be recorded.

In a particular embodiment, the user interface display 700 also includes one or more user selectable options to modify the recording configuration settings. For example, one or more of the entries 704-712 may be associated with an edit option 716. Selecting the edit option 716 may enable the user to modify the associated entry 704-712 (e.g., the associated recording rule or recording exception). The user interface display 700 may also include rule configuration options 714. The rule configuration options 714 may include a rule/exception option 720. The rule/exception option 720 allows the user to indicate whether media content is to be recorded when specified conditions are satisfied, or whether the media content is not to be recorded when the specified conditions are satisfied. For example, the rule/exception option 720 may be selectable between "Record program(s)" and "Do not record program(s)".

The rule configuration options 714 may also include a field option 722. The field option 722 may be used to specify a particular field of the EPG data that is to be examined to determine whether the recording rule or recording exception is satisfied. For example, the EPG data may include descriptive information for a plurality of programs. The descriptive information may be delimited into fields related to various aspects of the description. For example, the descriptive information may include data fields related to a title, a release date, a rating, user review information, a text description of the program, a genre, whether the program is live or not, whether the program is a rerun or not, a person associated with the program (e.g., an actor, actress, producer, director, writer, etc.), other descriptive information, or any combination thereof. In another particular embodiment, the descriptive information is delimited in some other manner, or not delimited at all.

The rule configuration options 714 may also include an operator option 724. The operator option 724 enables the user to specify an operator indicating how the condition may be satisfied. For example, the operator may include an equal to operator (=), a not equal to operator (≠), a greater than operator (>), a less than operator (<), a greater than or equal to operator (≥), a less than or equal to operator (≤), an includes operator, a does not include operator, another relational, mathematic, or logical operator, or any combination thereof.

The rule configuration options 714 may also include a condition value option 726. The condition value option 726 allows the user to specify a condition value to be satisfied for the rule or exception to be true. In a particular embodiment, the condition value may be any text or numeric value. For example, the condition value option 726 may include a text entry box. In another particular embodiment, the condition value option 726 may include a predefined list of selectable options that are displayed depending on the field option 722 that is selected. For example, when the field option 722 that is selected includes a release date, the condition value option 726 may include date related selections. In another example, when the field option 722 includes a genre selection, the condition value option 726 may include a predetermined list of genres.

In a particular embodiment, a recording rule or recording exception may include multiple conditions. For example, the rule configuration options 714 may include an add more conditions to this rule option 728. Selection of the add more conditions to this rule option 728 allows a user to specify one or more additional conditions and a logical relationship between the conditions. For example, the fourth entry 710 includes two conditions and a logical relationship between the conditions. That is, the fourth entry 710 indicates that a program is not to be recorded when the description of the program includes "flashback" or "revisit". The fourth entry 710 may be been created by using the rule configuration options 714 by specifying "Do not record programs" at rule/exception option 720, specifying "Description" at field option 722, specifying "=" (is equal to) at operator option 724, and entering a text value "flashback" at condition value option 726. The add more conditions to this rule option 728 may then be selected. After selecting the add more conditions to this rule option 728, a logical selection option (not shown) may be provided enabling the user to specify an "OR" relationship between the portions of the recording exception. The user may then specify "Do not record programs" at rule/exception option 720, specify "Description" at field option 722, specify "=" (is equal to) at operator option 724 and entering a text value "revisit" at condition value option 726. Alternately, the user may input the fourth entry 710 as a single entry by entering a logical operator in the condition value option 726 (e.g., "flashback" OR "revisit" may be entered as a single entry via the condition value option 726).

Embodiments disclosed herein enable a user to specify rules and exceptions for scheduling media content for recording. By allowing the user to specifying such rules and exceptions, the user is able to create rules that the govern recording of media content automatically based on a schedule. The user may establish a general rule that provides information about media content of interest to the user, and then specify one or more narrow exceptions to the rule. Thus, the user it better able to refine media content that is scheduled for recording.

Figure 8:
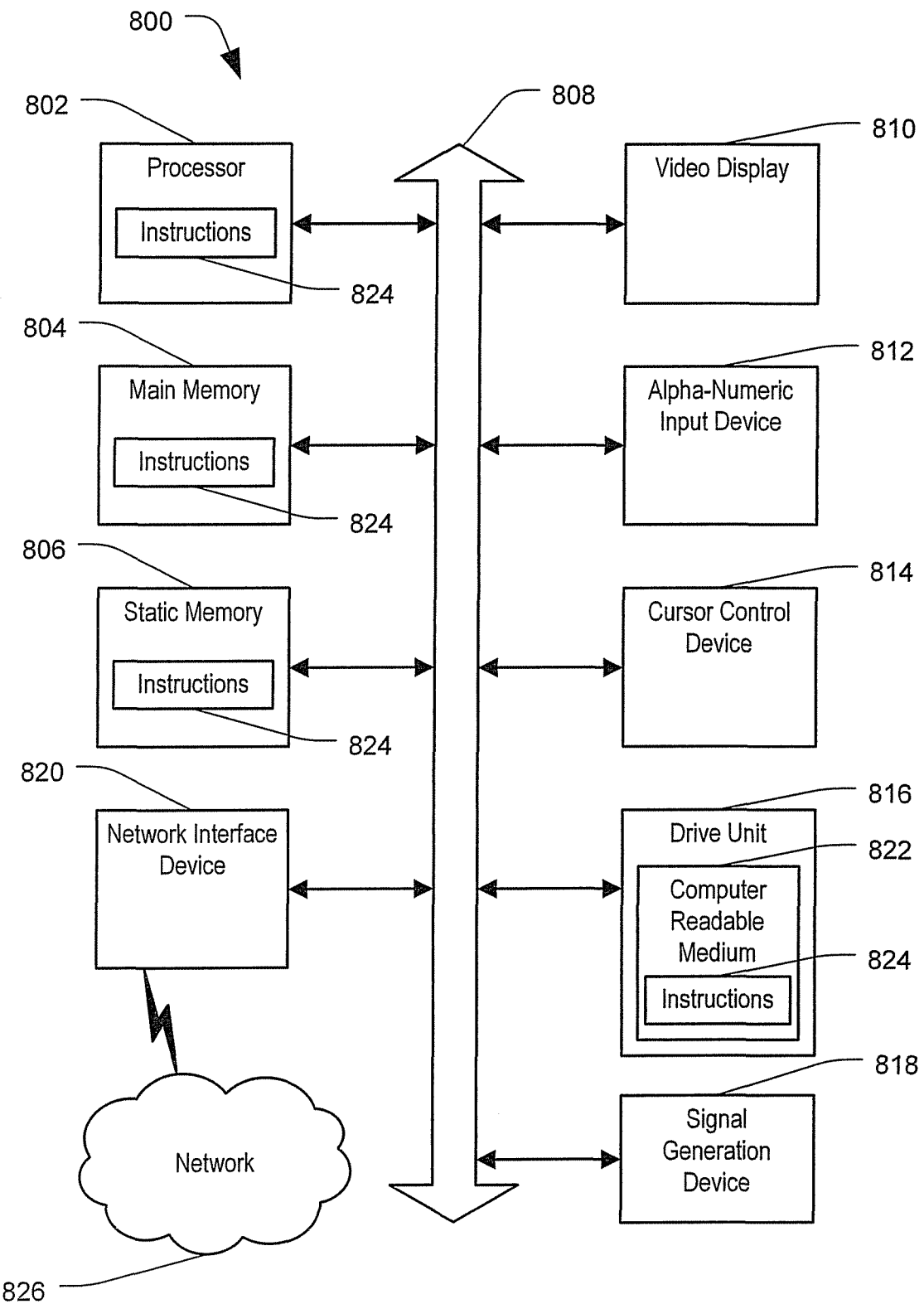
FIG. 8 is a block diagram of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse or remote control. The computer system 800 can also include a disk drive unit 816, a signal generation device 818, such as a speaker, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable storage medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   generating a graphical user interface operable to receive input defining a first condition associated with a first recording rule, the graphical user interface including:
      a field input operable to receive a selection of a particular field of electronic program guide data;
      an operator input operable to receive a selection of a particular operator;
      a value input comprising text box or a list of available values wherein when the value input comprises the list, the list is populated based on the selected particular field; and
      an add more conditions option operable to receive a selection of a second condition and a logical operation to be performed with respect to the second condition and the first condition;
      wherein when the value input comprises the text box and the text box receives a first value and a second value separated by a logical operator, the first condition is associated with the first value, a third condition associated with the second value is generated, and a second logical operation associated with the logical operator is to be performed with respect to the first condition and the third condition;
   accessing, via a memory, at least one recording rule, generated via the graphical user interface, that specifies a fourth condition, wherein the at least one recording rule indicates that a program of media content is to be scheduled for recording when the program satisfies the fourth condition;
   accessing, via the memory, at least one recording exception, generated via the graphical user interface, that specifies a fifth condition, wherein the at least one recording exception prohibits recording media content that satisfies the fifth condition;
   determining, at a processor, a recording schedule by analyzing information regarding a plurality of programs of media content with respect to the at least one recording rule and the at least one recording exception;
   storing the recording schedule, wherein the recording schedule identifies a plurality of programs to be recorded; and
   modifying the stored recording schedule based on user input.

2. The method of claim 1, wherein determining the recording schedule by analyzing the information regarding the plurality of programs of media content with respect to the at least one recording rule and the at least one recording exception includes:
   searching the electronic program guide data to identify a first set of programs that satisfy the fourth condition;
   searching the first set of programs to identify a second set of programs that satisfy the fifth condition; and
   scheduling programs of the first set of programs that are not in the second set of programs for recording.

3. The method of claim 1, wherein determining the recording schedule by analyzing the information regarding the plurality of programs of media content with respect to the at least one recording rule and the at least one recording exception includes:
   searching the electronic program guide data to identify a first set of programs that do not satisfy the fifth condition;
   searching the first set of programs to identify a second set of programs that satisfy the fourth condition; and
   scheduling programs of the second set of programs for recording.

4. The method of claim 1, further comprising:
   receiving the user input at a media recording device, wherein the user input specifies the at least one recording rule and the at least one recording exception; and
   in response to receiving a selection of an edit option associated with an established recording rule, presenting a rule configuration option to change the established recording rule from a record program rule to a do not record program rule.

5. The method of claim 1, wherein the first condition is satisfied by a particular program when information descriptive of the particular program includes a specified keyword.

6. The method of claim 1, wherein the first condition is satisfied by a particular program when the particular program is associated with a specified genre, the specified genre included in the at least one recording rule based on a selection of the specified genre from a list of genres.

7. The method of claim 1, wherein the first condition is satisfied by a particular program when the particular program includes a specified title.

8. The method of claim 1, wherein the first condition is satisfied by a particular program when the particular program is associated with a particular media channel.

9. The method of claim 1, further comprising:
   receiving the electronic program guide data, wherein the electronic program guide data includes metadata associated with the plurality of programs of media content;

wherein analyzing the information regarding the plurality of programs of media content with respect to the at least one recording exception includes performing a keyword search of the metadata to determine whether at least one of the plurality of programs satisfies the fifth condition.

10. The method of claim 1, wherein the recording schedule is determined at a network device associated with a media service provider.

11. The method of claim 1, wherein the user input cancels a particular program of the plurality of programs to be recorded.

12. The method of claim 10, further comprising:
recording media content based on the recording schedule at a network-based recording device; and
sending the recorded media content from the network-based recording device to a set-top box device at a subscriber residence in response to a request to access the recorded media content.

13. The method of claim 10, further comprising sending the recording schedule from the network device to a set-top box device.

14. The method of claim 10, further comprising automatically recording the program at the set-top box device based on the recording schedule.

15. A system comprising:
a user interface module to generate a graphical user interface operable to receive input defining a first condition associated with a first recording rule, the graphical user interface including:
a field input operable to receive a selection of a particular field of electronic program guide data;
an operator input operable to receive a selection of a particular operator;
a value input comprise a text box or a list of available values wherein when the value input comprises the list, the list is populated based on the selected particular field; and
an add more conditions option operable to receive a selection of a second condition and a logical operation to be performed with respect to the second condition and the first condition;
wherein when the value input comprises the text box and the text box receives a first value and a second value separated by a logical operator, the first condition is associated with the first value, a third condition associated with the second value is generated, and a second logical operation associated with the logical operator is to be performed with respect to the first condition and the third condition;
a memory to store first data specifying at least one recording rule generated via the user interface module and second data specifying at least one recording exception generated via the user interface module;
a scheduling module to generate a recording schedule based on the first data and the second data, wherein the recording schedule is stored in the memory;
wherein the at least one recording rule specifies a fourth condition and indicates that a program of media content is to be scheduled for recording when the program satisfies the fourth condition; and
wherein the at least one recording exception specifies a fifth condition and prohibits recording media content that satisfies the fifth condition; and
a user interface module to generate a user interface that enables a user to modify the stored recording schedule.

16. The system of claim 15, further comprising a recording module to record the program based on the recording schedule.

17. The system of claim 15, further comprising an electronic program guide module to receive the electronic program guide data, the electronic program data descriptive of a plurality of programs of media content, wherein the scheduling module analyzes the electronic program guide data with respect to the first data and the second data to generate the recording schedule.

18. A non-transitory computer-readable storage medium including processor executable instructions that, when executed by a processor, cause the processor to:
generate a graphical user interface operable to receive input defining a first condition associated with a first recording rule, the graphical user interface including:
a field input operable to receive a selection of a particular field of electronic program guide data;
an operator input operable to receive a selection of a particular operator;
a value input comprising a text box or a list of available values, wherein when the value input comprises the list, the list is populated based on the selected particular field; and
an add more conditions option operable to receive a selection of a second condition and a logical operation to be performed with respect to the second condition and the first condition;
wherein when the value input comprises the text box and the text box receives a first value and a second value separated by a logical operator, the first condition is associated with the first value, a third condition associated with the second value is generated, and a second logical operation associated with the logical operator is to be performed with respect to the first condition and the third condition;
access at least one recording rule, generated via the graphical user interface, that specifies a fourth condition, wherein the at least one recording rule indicates that a particular program of media content is to be scheduled for recording when the particular program satisfies the fourth condition;
access at least one recording exception, generated via the graphical user interface, that specifies a fifth condition, wherein the at least one recording exception prohibits recording media content that satisfies the fifth condition;
determine a recording schedule by analyzing information regarding a plurality of programs of media content with respect to the at least one recording rule and the at least one recording exception;
store the recording schedule; and
modify the stored recording schedule in response to user input.

19. The non-transitory computer-readable storage medium of claim 18, wherein the at least one recording exception prohibits recording of media content when information descriptive of the media content includes a specified key word wherein the specified keyword is flashback or revisit.

20. The non-transitory computer-readable storage medium of claim 18, wherein the at least one recording exception prohibits recording of media content associated with a particular topic.

21. The non-transitory computer-readable storage medium of claim 18, wherein the fifth condition includes a number of years, and wherein the at least one recording exception prohibits recording of media content originally released more than the number of years ago.

22. The non-transitory computer-readable storage medium of claim 18, wherein the particular field includes a user review field.

\* \* \* \* \*